(12) United States Patent
Imaizumi

(10) Patent No.: US 10,060,727 B2
(45) Date of Patent: Aug. 28, 2018

(54) INTERNAL DIAMETER MEASURING METHOD FOR TRANSPARENT TUBE

(71) Applicant: MITUTOYO CORPORATION, Kanagawa (JP)

(72) Inventor: Ryoichi Imaizumi, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 1 day.

(21) Appl. No.: 15/364,644

(22) Filed: Nov. 30, 2016

(65) Prior Publication Data
US 2017/0167854 A1   Jun. 15, 2017

(30) Foreign Application Priority Data

Dec. 15, 2015   (JP) .................................. 2015-244245

(51) Int. Cl.
*G01B 11/02* (2006.01)
*G01B 11/12* (2006.01)
*G01B 11/24* (2006.01)

(52) U.S. Cl.
CPC .......... *G01B 11/12* (2013.01); *G01B 11/2433* (2013.01)

(58) Field of Classification Search
CPC ....... G01B 11/08; G01B 11/12; G01B 11/255; G01B 11/105; G01B 11/0691; G01B 11/06; G01N 21/958
USPC .......................... 356/630–636, 640, 382, 128
See application file for complete search history.

(56) References Cited

U.S. PATENT DOCUMENTS

| | | | | |
|---|---|---|---|---|
| 3,027,457 A * | 3/1962 | Mouly | .................. | G01B 11/06 250/372 |
| 4,859,861 A * | 8/1989 | Mersch | .................. | G01B 11/08 250/559.22 |
| 5,118,954 A | 6/1992 | Grosso | | |
| 6,538,755 B1 * | 3/2003 | Propst, Jr. | ............. | C03B 37/018 356/635 |

(Continued)

FOREIGN PATENT DOCUMENTS

| | | |
|---|---|---|
| JP | H03-162606 A | 7/1991 |
| JP | 2001-108413 A | 4/2001 |

OTHER PUBLICATIONS

U.S. Appl. No. 15/376,934 to Yutaka Miki, which was filed on Dec. 13, 2016.

*Primary Examiner* — Tarifur Chowdhury
*Assistant Examiner* — Isiaka Akanbi
(74) *Attorney, Agent, or Firm* — Greenblum & Bernstein, P.L.C.

(57) ABSTRACT

A transparent tube is placed in a parallel laser light beam emitted from a light projector and reaching a photoreciever, and a detection signal indicating an amount of light received corresponding to a width direction position of the parallel laser light beam is obtained from the photoreceiver. Peaks formed in the detection signal by beams reflected by an inner circumferential surface of the transparent tube and incident to the photoreceiver are detected; width direction positions of two intersection points where the peaks cross a predetermined threshold value are detected; the width direction positions of the light beam reflected by the inner circumferential surface of the transparent tube are calculated from an average value of the two intersection points; and an internal diameter of the transparent tube is measured from the width direction positions.

4 Claims, 6 Drawing Sheets

(56) References Cited

U.S. PATENT DOCUMENTS

| | | | |
|---|---|---|---|
| 6,922,254 B2 * | 7/2005 | Blohm | G01B 11/105 |
| | | | 356/638 |
| 9,244,020 B2 * | 1/2016 | Leconte | G01B 11/06 |
| 9,423,241 B2 | 8/2016 | Fukuda et al. | |
| 2015/0276390 A1 | 10/2015 | Imaizumi et al. | |

* cited by examiner

Fig. 5          RELATED ART

INTERNAL DIAMETER MEASURING METHOD FOR TRANSPARENT TUBE

CROSS-REFERENCE TO RELATED APPLICATIONS

The present application claims priority under 35 U.S.C. § 119 of Japanese Application No. 2015-244245, filed on Dec. 15, 2015, the disclosure of which is expressly incorporated by reference herein in its entirety.

BACKGROUND OF THE INVENTION

1. Field of the Invention

The present invention relates to an internal diameter measuring method for a transparent tube.

2. Description of Related Art

Optical measuring apparatuses are used in order to conduct non-contact measurement of an external dimension of a measured object (such as an outer diameter of a cylindrical object). For example, a laser scan micrometer, image sensor micrometer, or light-section type 2D (two dimensional) shape measuring sensor is used. These apparatuses detect the outer diameter and the like of the measured object from measurements of shaded sections blocked by the measured object, using a plurality of parallel laser light beams arranged in a band shape or a laser beam scanning in a similar shape (see, for example Japanese Patent Laid-open Publication No. 2001-108413).

A measuring apparatus using such parallel laser light beams detects a change in an amount of light in a width direction of the parallel light beams when measuring the outer diameter and the like of the measured object. In other words, when the cylindrical object (as the measured object) is placed in the middle of a path of the parallel laser light beam, a middle portion of the light beams is blocked with the cylindrical object and only the light beams passing through two outer sides of the cylindrical object reach a photoreceiver. Specifically, an amount of received light detected by the photoreceiver is larger at the two outer sides of the cylindrical object but smaller at a shaded portion of the cylindrical object. Therefore, by detecting two positions on two sides in the width direction of the cylindrical object where the amount of received light rapidly decreases, the outer diameter of the cylindrical object can be measured from the distance between the two positions.

Further, in the measuring apparatus noted above, in order to detect the positions where the amount of received light rapidly decreases, a comparison is performed between a detection signal of the amount of received light and a predetermined threshold value. Specifically, there is a transition from a state where the amount of received light is large on the outer sides of the cylindrical object to a state where the amount of received light is small at the shaded portion of the cylindrical object. As a result, in the photoreceiver, it is possible to detect a first outside position of the cylindrical object when a photoreception signal decreases and is below the threshold value. In addition, there is a transition from a state where the amount of received light is small in the shaded portion of the cylindrical object to a state where the amount of received light is large outside of the cylindrical object. Accordingly, in the photoreceiver, it is possible to detect a second outside position on the opposite side of the cylindrical object when the photoreception signal increases and exceeds the threshold value.

The measuring apparatus using the parallel laser light beam noted above is used not only for the outer diameter measurement of the cylindrical object, but is suggested for use in an internal diameter measurement of a transparent tube (see, Japanese Patent Laid-open Publication No. H03-162606). In Japanese Patent Laid-open Publication No. H03-162606, among parallel laser beams passing through the transparent tube when the transparent tube is emitted, attention is paid to a specific beam in which a direction of an optical axis does not change and the internal diameter of the transparent tube (the maximum outer diameter of an inner circumferential surface) is geometrically calculated.

In FIG. 4, when a transparent tube 80 is placed on an optical path of a parallel laser light beam 90, the parallel laser light beam 90 is transmitted as is in regions E1 and E2 outside beams 91 and 92, which are tangent lines of an outer circumferential surface 81 of the transparent tube 80. In contrast, in a region E3 inside the beams 91 and 92, the parallel laser light beam 90 is blocked and a shade is formed. In the existing measuring apparatus, an outer diameter Do of the transparent tube 80 (the maximum outer diameter of the outer circumferential surface 81) is measured by detecting the positions of the beams 91 and 92. Further, the width direction of the parallel laser light beam 90 is a direction WD and an optical axis direction in which the parallel laser light beam 90 is emitted in a direction PD.

The parallel laser light beam 90 emitted toward the transparent tube 80 enters inside the transparent tube 80 refracted by the outer circumferential surface 81 of the transparent tube 80, is reflected by the inner circumferential surface 82, and is emitted from the outer circumferential surface 81 back to the outside. A portion of emitted beams 93 is in a state where the optical axis is parallel to the original parallel laser light beam 90. In FIG. 5, mainly three beams 94, 95, and 96 are observed in the shaded portion of the region E3. The beam 94 passes through a center of the transparent tube 80 and proceeds on the original optical axis without refracting since the beam 94 penetrates the outer circumferential surface 81 and the inner circumferential surface 82 orthogonally.

On the other hand, the beams 95 and 96 are reflected by the inner circumferential surface 82 mentioned above, emitted to an exterior again from the outer circumferential surface 81, and meet a condition that the emission optical axes are aligned to the original optical axes. By detecting the positions of the beams 95 and 96 (position in the width direction of the parallel laser light beam 90), using a geometric calculation based on those positions, two end positions of the inner circumferential surface 82 can be detected and an internal diameter Di of the transparent tube 80 (the maximum outer diameter of the inner circumferential surface 82) can be measured.

In the measurements of the internal/outer diameter of the transparent tube 80 as exemplified in FIGS. 4 and 5, based on the amount of light of the parallel laser light beam 90 passing outside the transparent tube 80 and the beams 95 and 96 transmitted through the transparent tube 80, the respective width direction positions (the width direction positions of the parallel laser light beam 90) are detected. In FIG. 6, the photoreceiver of the measuring apparatus receives the parallel laser light beam 90 passing outside the transparent tube 80 and beams 95 and 96 transmitted through the transparent tube 80, and outputs a detection signal S indicating an amount of light L for each width direction position P. In addition, in a scanning method, a scanning time stamp may be used instead of the width direction position P.

As noted above, in the regions E1 and E2 outside the beams 91 and 92 which are tangent lines of the outer circumferential surface 81 of the transparent tube 80, the parallel laser light beam 90 is transmitted as is and is received by the photoreceiver. Therefore, in the regions E1 and E2, the detection signal S indicates high amounts of light L1 and L2 respectively. On the other hand, in the shaded portion of the region E3, mainly the three beams 94, 95, and 96 are emitted parallel to the original optical axis (parallel laser light beam 90) and received by the photoreceiver. Therefore, in the region E3, peaks S4, S5, and S6 corresponding to the beams 94, 95, and 96 appear in the detection signal S. The peak S4 corresponds to the beam 94 transmitted through the center of the transparent tube 80 without refraction and indicates a high amount of light L4 relative to the light amounts L1 and L2. The peaks S5 and S6 correspond to the beams 95 and 96 reflected by the inner circumferential surface 82 of the transparent tube 80 and indicate light amounts L5 and L6 much smaller than the light amounts L1 and L2.

The internal diameter measurement of the transparent tube 80 noted above can be achieved by detecting the width direction positions of the peaks S5 and S6 corresponding to the beams 95 and 96. Specifically, a threshold value T is defined which is at a level intersecting with the peaks S5 and S6. The width direction positions P5 and P6, where the detection signal S exceeds the threshold value T, are detected and the internal diameter Di can be measured by performing a geometric calculation from these positions or a distance Dd between these positions.

However, in the internal diameter measurement of the transparent tube 80 noted above, the peaks S5 and S6 used in the calculation of the internal diameter Di each have width rather than being a single point, and also have a slope on both rising sides. Because of this, errors are unavoidable when detecting the positions (P5 and P6) exceeding the threshold value T.

In the outer diameter measurement for example, an intersection of the detection signal S with the threshold value is detected in an interval where the light amount L1 changes to the light amount L3. This point (corresponding to the beam 91) is determined to be outside of the transparent tube 80. When a similar procedure is applied to the inner diameter measurement, the intersection of the detection signal S with the threshold value T is detected in an interval where the light amount L3 changes to the light amount L5 at the peak S5. This point is determined to be the position P5 (corresponding to the beam 95). However, as shown enlarged in a circular region in FIG. 6, the actual position P5 is in the center of the peak S5. When the threshold value T is a threshold value T1 for example, the position P5 is offset from a point P51 where the detection signal S intersects with the threshold value T1 and an error is generated. In addition, depending on whether the threshold value T is the threshold value T1 or a threshold value T2, the intersection point may be P51 or P52, and an error may be generated. Such an error source is similar for the peak S6.

In this case, a distance Dd1 (calculated from the point P51 and a point P61 where the threshold value T is the threshold value T1) does not match the correct distance Dd calculated from the original positions P5 and P6. Furthermore, when the threshold value T fluctuates and the threshold value T1 is changed to the threshold value T2, the distance Dd1 changes to a distance Dd2 calculated from the points P52 and P62. As a result, since the positions P5 and P6, or the distance Dd may include an error, the internal diameter Di of the transparent tube 80 cannot be calculated accurately.

SUMMARY OF THE INVENTION

The present invention provides an internal diameter measuring method for a transparent tube which can measure an internal diameter of the transparent tube accurately using a parallel laser light beam.

Inventors arrived at the present invention based on the knowledge that an outer diameter measurement of a cylindrical object has, on each of two sides, one intersection between a threshold value and a detection signal of a light amount, and in contrast, an internal diameter measurement of a transparent tube has two intersections between a peak of the detection signal corresponding to the internal diameter and the threshold value on each of two sides of the peak. In the present invention, by detecting a position intersecting with the threshold value at two points on each side and by obtaining a position of a midpoint thereof, a position of a light beam corresponding to an inner circumferential surface is measured accurately, and therefore, the internal diameter can be measured accurately. Specifically, the present invention includes the following configuration.

The present invention is an internal diameter measuring method for a transparent tube measuring an internal diameter of the transparent tube using a parallel laser light beam. In this method, a light projector forming the parallel laser light beam and a photoreceiver receiving the parallel laser light beam from the light projector are set, and the transparent tube is arranged between the light projector and the photoreceiver; a detection signal indicating an amount of received light corresponding to a width direction position of the parallel laser light beam is obtained from the photoreceiver, and a peak in the detection signal formed by a light beam reflected by an inner circumferential surface of the transparent tube and incident to the photoreceiver is detected; the width direction positions of two intersections where the peak intersects with a predetermined threshold value are detected, and the width direction position of the light beam reflected by the inner circumferential surface of the transparent tube is calculated from an average value of the two intersection points; and a geometric calculation is performed from the width direction position of the light beam and the internal diameter of the transparent tube is measured.

In the present invention, a center position of the peak can be detected by taking the average value of the two intersection points where the peak of the detection signal formed by the light beam reflected by the inner circumferential surface of the transparent tube intersects the threshold value. The center position corresponds to the center position of the light beam reflected by the inner circumferential surface of the transparent tube and thus corresponds accurately to the position of the inner circumferential surface of the transparent tube. Therefore, the internal diameter can be found accurately by calculating positions on two sides of the inner circumferential surface based on the center position. Furthermore, according to the present invention, even when the positions of the intersection points of the detection signal fluctuate because the threshold value fluctuates, effects from fluctuation can be avoided by detecting the position of the midpoint and the internal diameter can be found accurately based on this point.

In the measuring method of the present invention, preferably, the calculation of the width direction positions of the inner circumferential surface is performed on two sides of the transparent tube and the internal diameter of the transparent tube is calculated from the width direction positions of the inner circumferential surface on the two sides. In the present invention, the internal diameter can be measured accurately since the internal diameter is calculated from positions on two sides of the inner circumferential surface. In addition, when the center position of the transparent tube is accurately found, the inner diameter can be measured even from the position on a single side of the inner circumferential surface. However, by measuring each position on the two sides of the transparent tube, the internal diameter can be measured accurately.

According to the present invention, the internal diameter of the transparent tube can be measured accurately using the parallel laser light beam.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
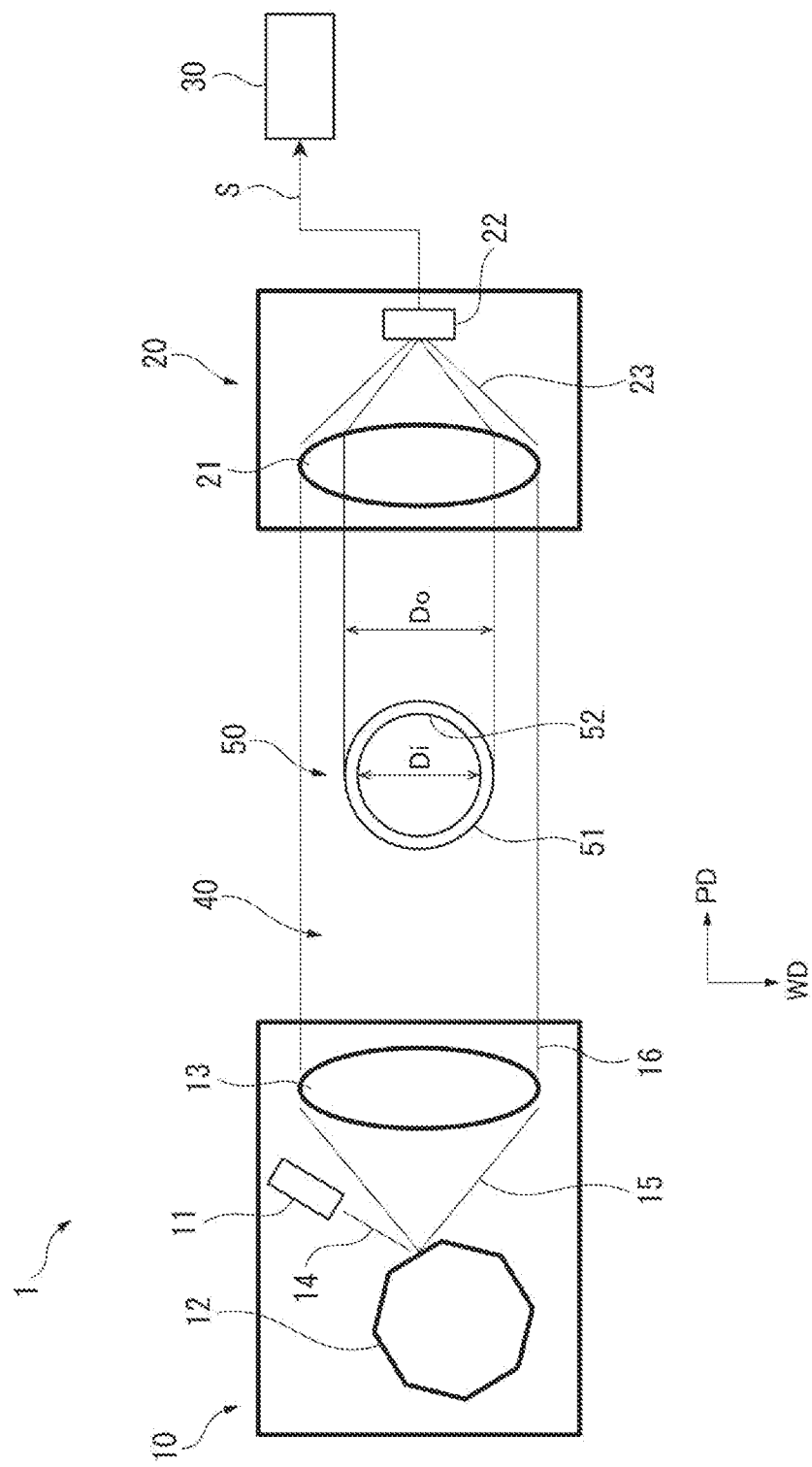
FIG. 1 illustrates a schematic view of a measuring apparatus according to an embodiment of the present invention.
Figure 2:
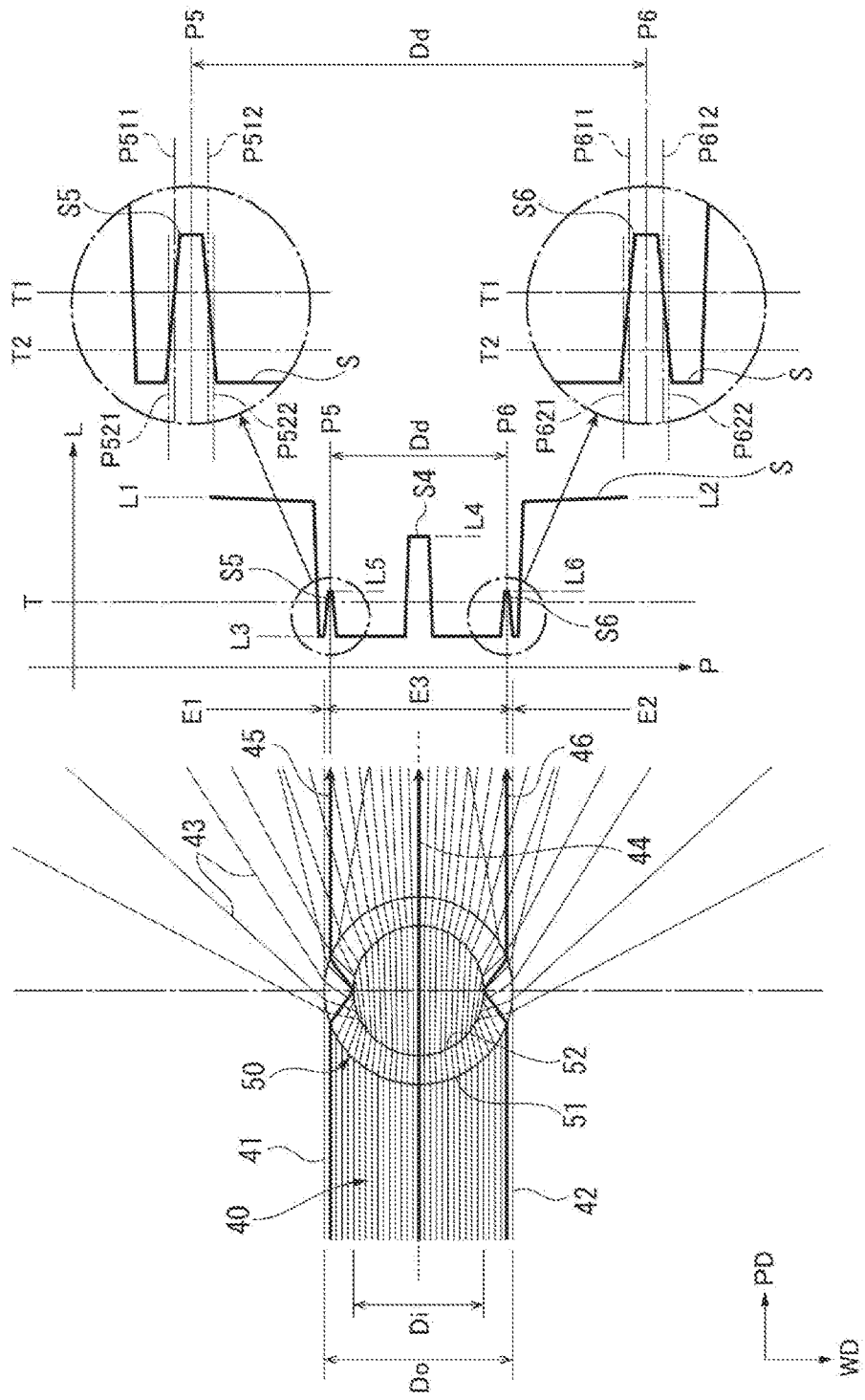
FIG. 2 illustrates a schematic view of the measuring apparatus according to the embodiment of the present invention.
Figure 3:
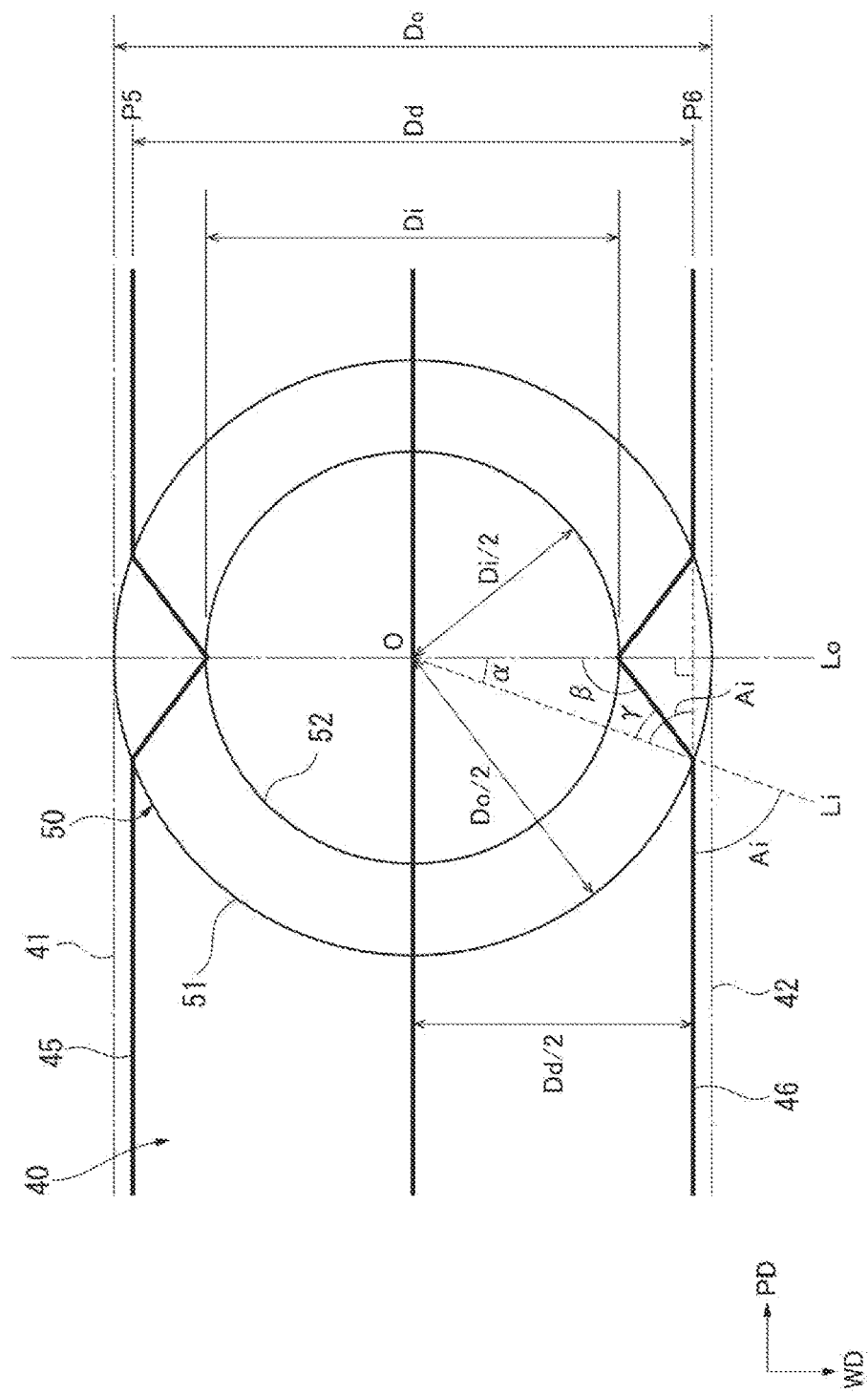
FIG. 3 illustrates a schematic view of a computation in a measurement according to the embodiment of the present invention.
Figure 4:
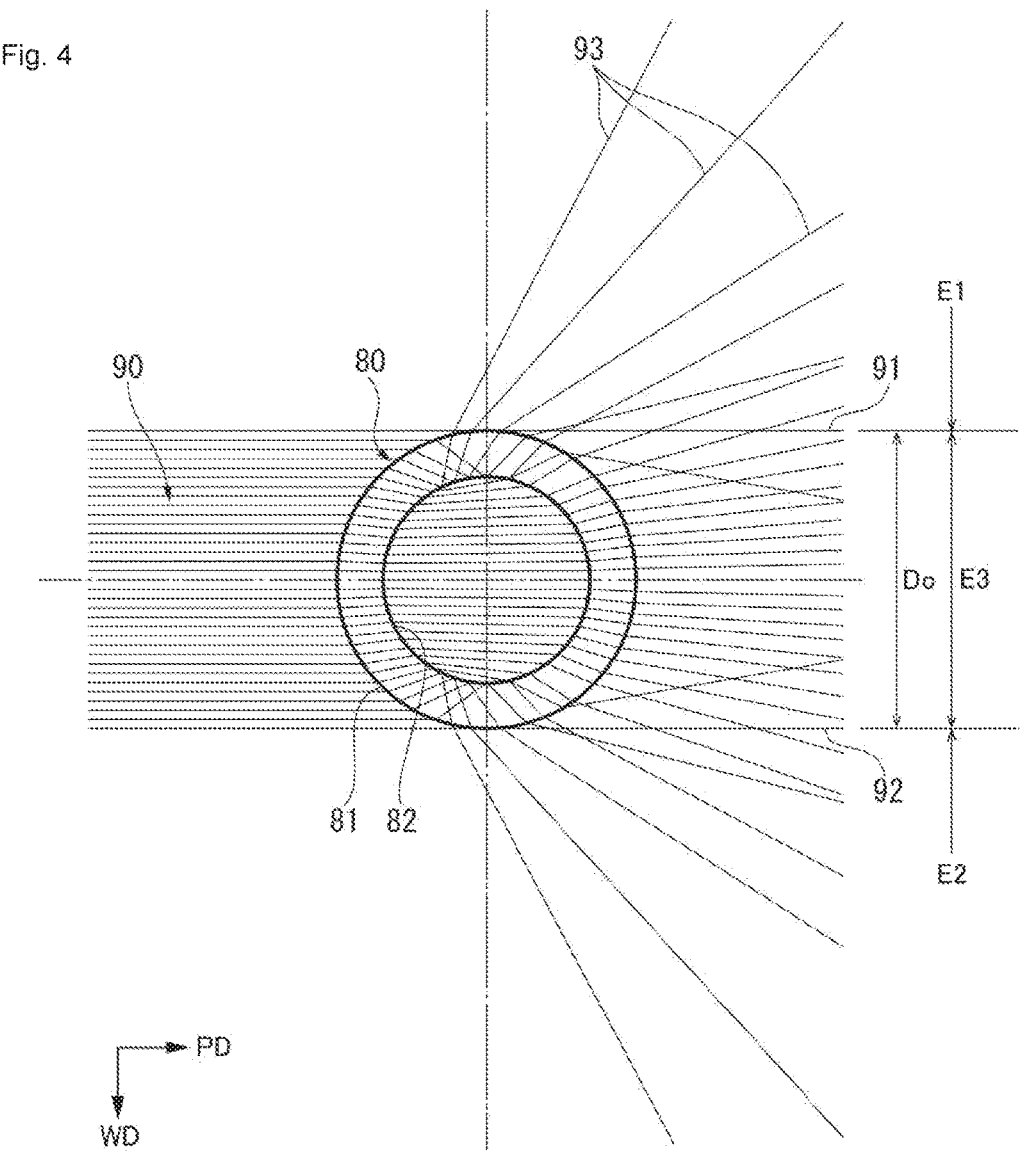
FIG. 4 illustrates a schematic view of a light beam when a transparent tube is placed in a parallel laser light beam.
Figure 5:
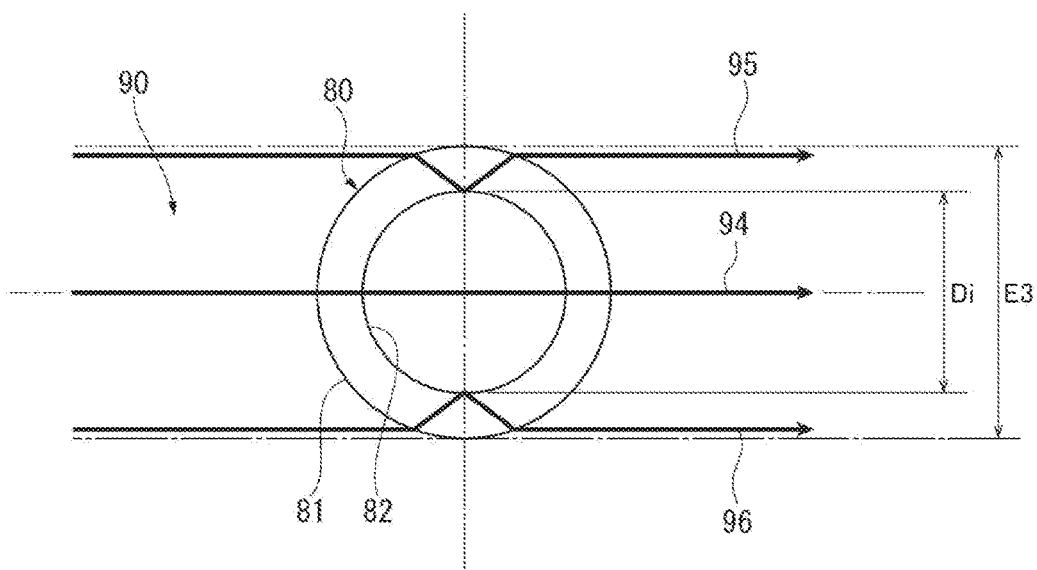
FIG. 5 illustrates a schematic view of a specific light beam transmitted through the transparent tube.
Figure 6:
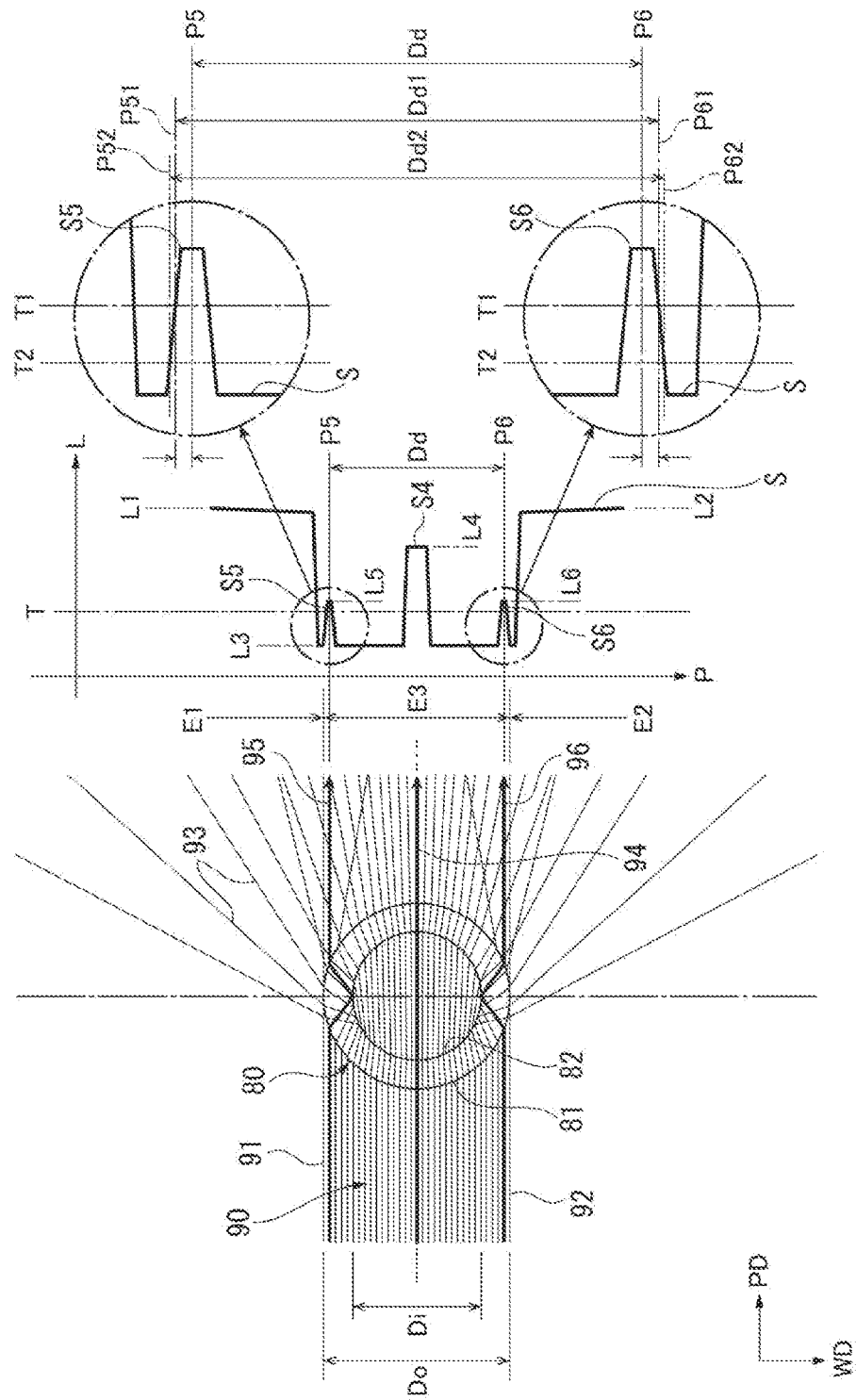
FIG. 6 illustrates a schematic view of a conventional internal diameter measurement.

Hereafter, an embodiment of the present invention is described based on FIGS. 1 to 3. In FIG. 1, a measuring apparatus 1 is a device measuring an outer dimension of a measured object (a transparent tube 50) using a parallel laser light beam. In the present embodiment, a laser scanning micrometer is used for the measuring apparatus 1. The measuring apparatus 1 includes a light projector 10 and a photoreceiver 20. The photoreceiver 20 is connected to a control apparatus 30.

The light projector 10 includes a laser light source 11, a polygonal mirror 12, and a collimator lens 13. In the light projector 10, a beam-like laser light 14 from the laser light source 11 is reflected by the polygonal mirror 12. A reflected light 15 is output through the collimator lens 13 and forms a measurement light beam 16. The polygonal mirror 12 is rotation-driven by a rotation drive mechanism not shown in the drawings. Accordingly, the beam of the reflected light 15 reflected by the polygonal mirror 12 is oscillated in a fan shape and a belt-shaped parallel laser light beam 40 is formed by the parallel measurement light beam 16 emitted through the collimator lens 13. Further, in the parallel laser light beam 40, a width direction is a direction WD and an optical axis direction in which light is emitted in a direction PD.

The photoreciever 20 includes a collimator lens 21 arranged on an optical path of the measurement light beam 16 and an optical sensor 22 arranged at a focusing position of the collimator lens 21. The parallel laser light beam 40 from the light projector 10 strikes the photoreceiver 20. The incident parallel laser light beam 40 is converged by the collimator lens 21 and convergent light 23 strikes the optical sensor 22. The optical sensor 22 detects optical intensity of the received convergent light 23 and outputs the detected intensity to the exterior control apparatus 30 as a detection signal S corresponding to the width direction of the parallel laser light beam 40 (see FIG. 2).

The transparent tube 50 (object to be measured) is arranged between the light projector 10 and the photoreceiver 20. The transparent tube 50 is formed with a transparent material, having an outer diameter Do of an outer circumferential surface 51 and an internal diameter Di of an inner circumferential surface 52. In the present embodiment, accurate measurement of the internal diameter Di of the inner circumferential surface 52 is performed using the parallel laser light beam 40.

In FIG. 2, when the transparent tube 50 is placed on the optical path of the parallel laser light beam 40, the parallel laser light beam 40 passes through as-is in regions E1 and E2 outside of beams 41 and 42, which are tangent to the outer circumferential surface 51 of the transparent tube 50. In contrast, in a region E3 inside the beams 41 and 42, the parallel laser light beam 40 is blocked and a shadow is formed. By detecting positions of the beams 41 and 42, the outer diameter Do of the transparent tube 50 can be measured.

The parallel laser light beam 40 emitted toward the transparent tube 50 enters inside the transparent tube 50 refracted by the outer circumferential surface 51 of the transparent tube 50, is reflected by the inner circumferential surface 52, and is emitted to an exterior again from the outer circumferential surface 51. A portion of emitted beams 43 is in a state where the optical axis is parallel to the original parallel laser light beam 40. In the shaded portion of the region E3, mainly three beams 44, 45, and 46 are observed as the beam 43 in which the optical axis is parallel to the original parallel laser light beam 40. Of the three beams, the beam 44 passes through a center of the transparent tube 50 and proceeds on the original optical axis without refracting since the beam 44 penetrates the outer circumferential surface 51 and the inner circumferential surface 52 orthogonally.

On the other hand, the beams 45 and 46 are reflected by the inner circumferential surface 52 mentioned above and are emitted to the exterior again from the outer circumferential surface 51, and in addition, the beams 45 and 46 meet the condition that the emission optical axis aligns with the original optical axis. By detecting the positions of the beams 45 and 46 (position in the width direction of the parallel laser light beam 40), using a geometric calculation based on those positions, two end positions of the inner circumferential surface 52 can be detected and the internal diameter Di of the transparent tube 50 (the maximum outer diameter of the inner circumferential surface 52) can be measured.

These measurement processes are executed by the control apparatus 30. The control apparatus 30 detects each width direction position (width direction position of the parallel laser light beam 40) based on the light amount of the parallel laser light beam 40 passing outside the transparent tube 50 and the beams 45 and 46 passing through the transparent tube 50. The photoreceiver 20 receives the parallel laser light beam 40 passing outside the transparent tube 50 and beams 45 and 46 passing through the transparent tube 50 and outputs the detection signal S indicating an amount of light L for each width direction position P. In the present embodiment, the measuring apparatus 1 uses a scanning method and the light projector 10 scans by oscillating a single laser beam in the width direction of the parallel laser light beam 40. Accordingly, a scanning time stamp in the light projector 10 is used for the width direction position P of the parallel laser light beam 40.

As described above, in the regions E1 and E2 outside the beams 41 and 42 tangent to the outer circumferential surface 51 of the transparent tube 50, the parallel laser light beam 40 passes through as-is and is received by the photoreceiver 20. Therefore, the detection signal S indicates high amounts of light L1 and L2 in the regions E1 and E2, respectively. On the other hand, in the shaded area of the region E3, mainly the three beams 44, 45, and 46 are emitted parallel to the original optical axis (the parallel laser light beam 40) and are received by the photoreceiver 20. Therefore, in the region E3, peaks S4, S5, and S6 corresponding to beams 44, 45, and 46 appear in the detection signal S. The peak S4 corresponds to the beam 44 transmitted without refraction through the center of the transparent tube 50 and indicates a high amount of light L4 relative to the light amounts L1 and L2. The peaks S5 and S6 correspond to the beams 45 and 46 reflected by the inner circumferential surface 52 of the transparent tube 50 and indicate light amounts L5 and L6 much smaller than the light amounts L1 and L2.

The internal diameter measurement of the transparent tube 50 noted above can be achieved by detecting the width direction positions of the peaks S5 and S6 corresponding to the beams 45 and 46. Specifically, a threshold value T is set which is at a level intersecting the peaks S5 and S6, the width direction positions P5 and P6 where the detection signal S exceeds the threshold value T are detected, and a distance Dd between them can be measured.

In the present embodiment, for detecting the width direction positions P5 and P6, the width direction positions of two intersection points crossing the threshold value T are detected for each of the peaks S5 and S6. For the peak S5, in rising portions on both sides, intersection points P511 and P512 crossing a threshold value T1 are detected, for example. By calculating an average value of each, the width direction position P5 which is a center point of each intersection point P511 and P512 is detected. For the peak S6, similarly, intersection points P611 and P612 crossing the threshold value T1 are detected and the width direction position P6 which is the center point of each intersection point P611 and P612 is calculated from each of the average values.

The width direction positions P5 and P6 are the center positions of the peaks S5 and S6 respectively and indicate the accurate width direction positions of the peaks S5 and S6. In this example, when the threshold value T1 fluctuates to a threshold value T2, intersection points P521 and P522 of the peak S5 crossing the threshold value T2 change; however, the width direction position P5 (as the average value) does not fluctuate. In addition, the intersection points P621 and P622 of the peak S6 crossing the threshold value T2 change; but the width direction position P6 (as the average value) does not fluctuate. Therefore, even when the threshold value T fluctuates, the width direction positions P5 and P6 do not change and accurate width direction positions of the peaks S5 and S6 are always shown.

When the accurate width direction positions P5 and P6 of the peaks S5 and S6 and the distance Dd are detected, the width direction positions on two sides of the inner circumferential surface 52 are calculated by the geometric calculation. In FIG. 3, when a normal line Li of the outer circumferential surface 51 passes through incident positions of the beams 45 and 46, an incident angle $Ai=\sin^{-1} (Dd/Do)$ of the beams 45 and 46 with respect to the normal line Li of the outer circumferential surface 51 is obtained from the detected distance Dd and the outer diameter Do of the transparent tube 50. In addition, from the incident angle Ai and a refractive index n of the material of the transparent tube 50, a refractive angle $r=\sin^{-1} (\sin Ai/n)$ of the beams 45 and 46 striking the transparent tube 50 with respect to the normal line Li is obtained. Next, from the refraction angle r and an angle $\alpha$ between the normal line Li and an axis line Lo crossing the optical axis of the parallel laser light beam 40, an angle $\beta$ of the beams 45 and 46 striking the transparent tube 50 with respect to the axis line Lo is calculated. When the angles r and $\beta$ are found, $Di/\sin r = Do/\sin \beta$ is obtained based on the sine theorem and the internal diameter $Di=Do (\sin r/\sin \beta)$ is obtained.

Further, the calculation noted above used the distance Dd between the width direction positions P5 and P6, but the calculation may be performed using a distance from a center O of the transparent tube 50 to the width direction positions P5 and P6 without using the distance Dd, so long as the internal diameter Di can be confirmed from the geometric relationship illustrated in FIG. 3. In this case, only the center O of the transparent tube 50 and one of the width direction positions P5 or P6 are required to be known. With the position of the center O of the transparent tube 50 in the width direction of the parallel laser light beam 40, the calculation can be performed by detecting the center position of the beam 44, for example. At that point, similar to the detection of the width direction positions P5 and P6, the accurate center position of the beam 44 is preferably found by obtaining two points where the threshold value intersects with both sides of the peak corresponding to the beam 44 in the detection signal S.

In the present embodiment noted above, the peaks S5 and S6 are formed in the detection signal S by the beams 45 and 46 reflected by the inner circumferential surface 52 of the transparent tube 50. At that point, two intersection points crossing the threshold value T are detected for each of the peaks S5 and S6 and the average value of the two points is obtained, and therefore the width direction positions P5 and P6 of the center of the peaks S5 and S6 can be detected accurately. The width direction positions P5 and P6 correspond to the center position of the beams 45 and 46 reflected by the inner circumferential surface 52 of the transparent tube 50, and therefore, accurately reflect the position of the inner circumferential surface 52. Accordingly, by calculating the positions on both sides of the inner circumferential surface 52 based on the width direction positions P5 and P6, the accurate internal diameter Di can be obtained.

Further, according to the present invention, even when the threshold value T fluctuates and the position of the intersection point with the detection signal S changes, influences of fluctuations can be avoided by detecting the width direction positions P5 and P6, which are midpoints, and the accurate internal diameter Di can be obtained in this respect.

Additionally, in the present embodiment, the width direction positions P5 and P6 are calculated on two sides of the inner circumferential surface 52 and the internal diameter Di is calculated using the distance Dd between the width direction positions P5 and P6. Therefore, the accurate internal diameter Di can be measured without using the center O of the transparent tube 50.

Moreover, the present invention is not limited to the above-described embodiment, and includes modifications within a scope capable of achieving the advantages of the present invention. In the above-described embodiment, a laser scanning micrometer is used as the measuring apparatus 1 forming the parallel laser light beam 40; however, an image sensor micrometer or an optical slicing two-dimensional shape measuring sensor may be used. In addition, as mentioned in the description of the embodiment, instead of measuring the entire width of the transparent tube 50 with the parallel laser light beam 40, only a half, from the center O to one side, may be measured by the parallel laser light beam 40, and the internal diameter Di can be measured from the center O and one of the width direction positions P5 or P6.

The present invention can be used for an internal diameter measurement of a transparent tube and for a high precision internal diameter measurement using a parallel laser light beam.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An internal diameter measurement method for an internal diameter of a transparent tube using a parallel laser light beam, the method comprising:

emitting, using a light projector, a first laser light beam and a second laser light beam, the first laser light beam being parallel to the second laser light beam;

receiving, using a photoreceiver, the first laser light beam and the second laser light beam, the first laser light beam and the second laser beam passing through the transparent tube interposed between the light projector and the photoreceiver;

obtaining, from the photoreceiver, a first detection signal indicating an amount of received light corresponding to a width direction position of the first laser light beam;

obtaining, from the photoreceiver, a second detection signal indicating an amount of received light corresponding to a width direction position of the second laser light beam;

detecting a first peak point in the first detection signal formed by the first laser light beam reflected by an inner circumferential surface of the transparent tube and incident to the photoreceiver, the first peak point having a slope on each side of the first peak point;

detecting a second peak point in the second detection signal formed by the second laser light beam reflected by the inner circumferential surface of the transparent tube and incident to the photoreceiver, the second peak point having a slope on each side of the second peak point;

detecting a first set of width direction positions of two intersections where the slopes of first peak point cross a predetermined threshold value;

detecting a second set of width direction positions of two intersections where the slopes of second peak point cross the predetermined threshold value;

averaging values of the two intersections for the first peak point for calculating an averaged first peak point;

averaging values of the two intersections for the second peak point for calculating an averaged second peak point;

calculating, from a distance between the averaged first peak point and the averaged second peak point, a third set of width direction positions of the first laser light beam and the second laser light beam; and performing a geometric calculation from the third set of width direction positions of the first laser light beam and the second laser light beam for measuring the internal diameter of the transparent tube.

2. The method according to claim 1, wherein the calculating includes calculating a fourth set of width direction positions on two sides of the transparent tube such that the internal diameter of the transparent tube is measured from the fourth set of the width direction positions of the inner circumferential surface on the two sides.

3. The method according to claim 1, wherein the light projector includes a light source that emits a source light; and a polygonal mirror that reflects the source light and emits the reflected light towards the photoreceiver as a measurement light beam.

4. The method according to claim 1, wherein, when the predetermined threshold value fluctuates to have a different value, each of the averaged first peak point and the averaged second peak point maintains a constant value.

* * * * *